(12) United States Patent
Okamoto

(10) Patent No.: US 7,594,487 B2
(45) Date of Patent: Sep. 29, 2009

(54) APPARATUS FOR AND METHOD OF CONTROLLING MOTION MECHANISM

(75) Inventor: Naoki Okamoto, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 266 days.

(21) Appl. No.: 11/657,729

(22) Filed: Jan. 25, 2007

(65) Prior Publication Data

US 2007/0186886 A1    Aug. 16, 2007

(30) Foreign Application Priority Data

Jan. 26, 2006    (JP)    ............... 2006-017471

(51) Int. Cl.
*F01L 1/34* (2006.01)
(52) U.S. Cl. ............... 123/90.16; 123/90.15
(58) Field of Classification Search .............. 123/90.15, 123/90.16, 90.17, 90.18; 464/1, 2, 160
See application file for complete search history.

(56) References Cited

U.S. PATENT DOCUMENTS 6,575,128 B2 * 6/2003 Nakamura et al. ....... 123/90.16

FOREIGN PATENT DOCUMENTS

JP    2003-194580    7/2003
JP    2005-188286    7/2005

* cited by examiner

*Primary Examiner*—Ching Chang
(74) *Attorney, Agent, or Firm*—Foley & Lardner LLP (57) ABSTRACT

A variable valve mechanism, which rotates a control shaft by means of an actuator to continuously change a lift amount of an engine valve, is configured in a manner such that when a sensor output in response to a minimum valve lift position defined by a stopper capable of restricting the rotation of the control shaft, is detected, a manipulated variable for the actuator is restricted so as to restrict a pressing force by the stopper, and also an angular speed of the control shaft toward the minimum valve lift position, to thereby reduce an inertia force of the control shaft.

15 Claims, 6 Drawing Sheets

APPARATUS FOR AND METHOD OF CONTROLLING MOTION MECHANISM

BACKGROUND OF THE INVENTION

1. Field of the Invention

The present invention relates generally to an apparatus for and a method of controlling a motion mechanism incorporating therein an actuator for regulatively moving a movable member, and more particularly, to a technology for detecting a signal produced by a position sensor at a reference position of the movable member in the motion mechanism during the movement of the movable member by the actuator.

2. Description of the Related Art

Japanese Unexamined Patent Publication No. 2005-188286 discloses a variable valve mechanism which rotates a control shaft by means of an actuator, to variably and continuously control a lift amount of an engine valve and an operating angle thereof.

Further, the above Publication discloses that the actuator is controlled so that the valve lift amount reaches a minimum value during the fuel cut-off of the engine, and when it is determined that the valve lift amount reaches the minimum value, an output of a sensor that produces a signal indicating an angular position of the control shaft is detected and a correlation between the output of the sensor and the angular position of the control shaft is adjusted for correction.

In the case where the valve lift amount is set to take the minimum value, the rotation of the control shaft is restricted to be stopped by an appropriate stopper member. However, a torque of the actuator continues to be applied to the control shaft.

Herein, in the case where the sensor detecting the angular position of the control shaft is comprised of a magnet mounted on an end portion of the control shaft and electromagnetic conversion means fixedly arranged at a position facing the magnet, if the torque of the actuator continues to be applied to the control shaft, a mounting portion of the magnet is deflected while causing a variation of the sensor output.

Consequently, there occurs such a problem that the sensor output for a case when the valve lift amount is made to be the minimum value cannot be detected with high precision.

SUMMARY OF THE INVENTION

In view of the above problem, the present invention has an object to enable it to precisely detect a sensor output, even in the case where a movable member of a motion mechanism is moved to a reference position at which the movement thereof is restricted by a stopper member to thereby detect the sensor output at the reference position.

In order to achieve the above object, in accordance with the present invention, when a movable member of the motion mechanism is moved by the actuation of an actuator toward a predetermined reference position at which a movement thereof is restricted by a stopper mechanism, a manipulated variable, which is adjustably given to the actuator as a controlling input from a controller, e.g., a control unit is restricted according to a limit value of the said manipulated value.

The other objects and features of this invention will become understood from the following description with reference to the accompanying drawings.

DESCRIPTION OF PREFERRED EMBODIMENTS

Figure 1:
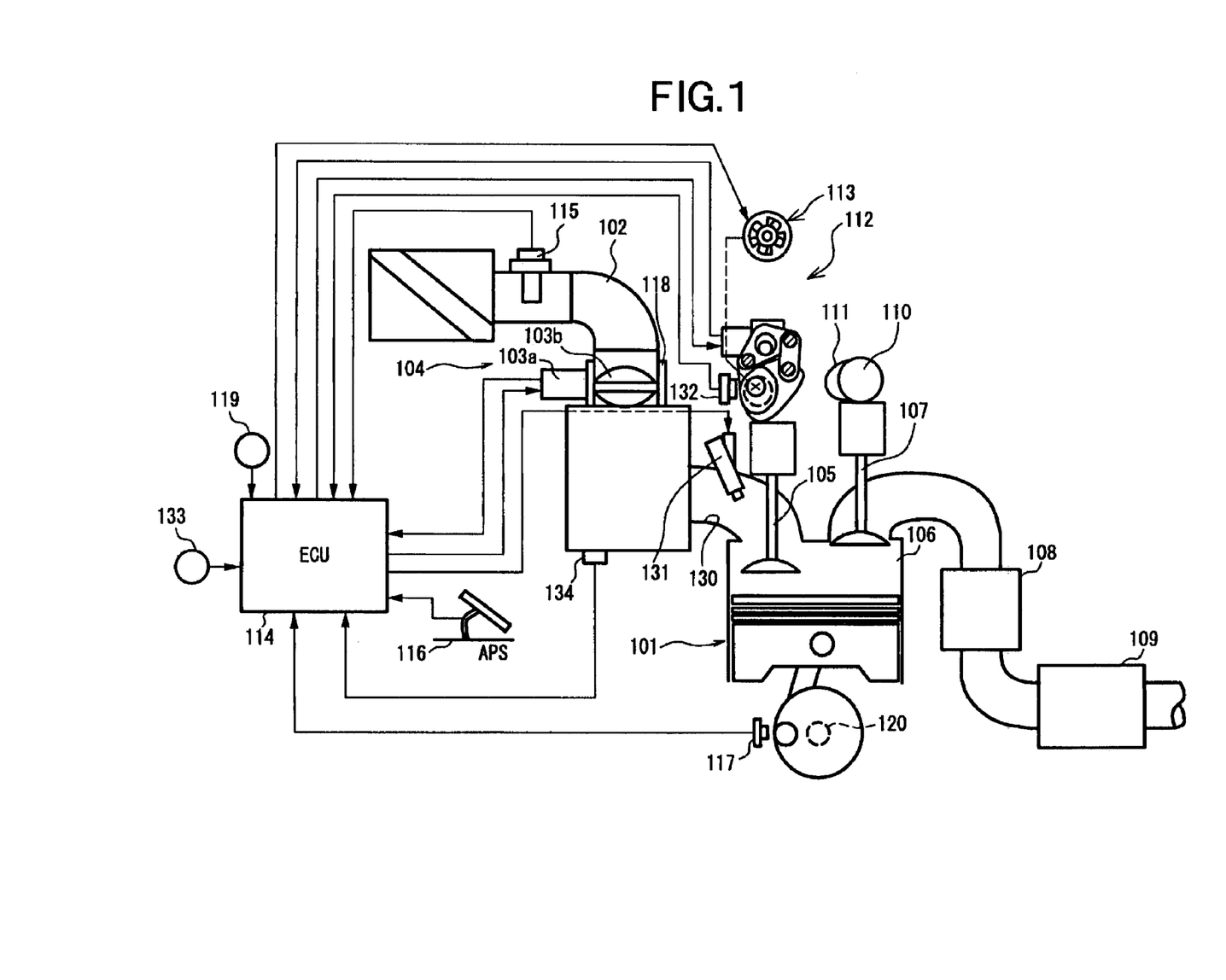
FIG. 1 is a systematic view of a vehicular engine, e.g., a car engine to which the present invention is applied.

FIG. 1 is a systematic view typically showing an engine for a car. In FIG. 1, in an intake pipe 102 of an engine (internal combustion gasoline engine) 101, there is disposed an electronically controlled throttle 104 which drives to open or close a throttle valve 103b by a throttle motor 103a.

In each cylinder, the air is sucked into a combustion chamber 106 via electronically controlled throttle 104 and an intake valve 105.

Further, an electromagnetic-type-fuel-injection valve 131 is disposed to an intake port 130 on the upstream side of intake valve 105 in each cylinder.

Fuel injection valve 131 injects fuel of amount proportional to injection pulse width of an injection pulse signal which is sent from an engine control unit 114.

The fuel sucked into combustion chamber 106 is ignited to be combusted by a spark ignition by an ignition plug (not shown in the figure).

The exhaust gas in combustion chamber 106 is discharged via an exhaust valve 107 and thereafter, is purified by a front catalytic converter 108 and a rear catalytic converter 109 to be discharged into the atmosphere.

Furthermore, there are disposed a variable valve lift mechanism 112 and a variable-valve timing mechanism 113, which varies opening characteristics of intake valve 105.

Variable valve lift mechanism 112 is a mechanism for continuously varying a lift amount of intake valve 105 as well as an operating angle thereof.

Further, variable valve timing mechanism 113 is a mechanism for continuously varying a phase of the center of the operating angle of intake valve 105 by changing a rotational phase of an intake valve drive shaft 3 relative to a crankshaft 120.

As variable valve timing mechanism 113, such a mechanism is used in which vanes supported by intake valve drive shaft 3 are disposed in a casing supported by a cam sprocket, so that an advance-angle-side hydraulic chamber and a retarded-angle-side-hydraulic chamber are formed on both sides of each vane, and the supply/discharge of oil pressure in each of the advance-angle-side-hydraulic chamber and the retarded-angle-side-hydraulic chamber is controlled, so that a relative angle of each vane to the cam sprocket is changed, thereby changing the rotational phase of intake valve drive shaft 3 relative to crankshaft 120.

On the other hand, exhaust valve 107 is driven to open or close by a cam 111 disposed to a camshaft 110 while maintaining a fixed valve lift amount, a fixed valve operating angle and fixed valve timing.

Engine control unit 114 which incorporates therein a microcomputer, sets a fuel injection amount, ignition timing, a target intake air amount and a target intake negative pressure by computation process in accordance with previously stored programs, and also, based on the set fuel injection amount, ignition timing, target intake air amount and target intake negative pressure, outputs control signals to fuel injection valve 131, a power transistor for an ignition coil, electronically controlled throttle 104, variable valve lift mechanism 112 and variable valve timing mechanism 113.

Incidentally, in the present embodiment, electronically controlled throttle 104 is disposed for mainly generating an intake-negative pressure, and an intake-air amount of engine 101 is controlled by varying the opening characteristics of intake valve 105 by variable valve lift mechanism 112 and variable valve timing mechanism 113.

Engine control unit 114 receives detection signals from an air flow meter 115 for detecting the intake air amount of engine 101, an accelerator pedal sensor 116 for detecting a depression amount of an accelerator pedal operated by a vehicle driver, a crank angle sensor 117 for outputting a crank angle signal at each of reference rotational positions of crankshaft 120, a throttle sensor 118 for detecting an opening TVO of throttle valve 103b, a water temperature sensor 119 for detecting the cooling water temperature of engine 101, a cam sensor 132 for outputting a cam signal at each of reference rotational positions of intake valve drive shaft 3 and an intake pressure sensor 134 for detecting an intake manifold pressure on the downstream side of throttle valve 103b and also on the upstream side of intake valve 105.

Figure 2:
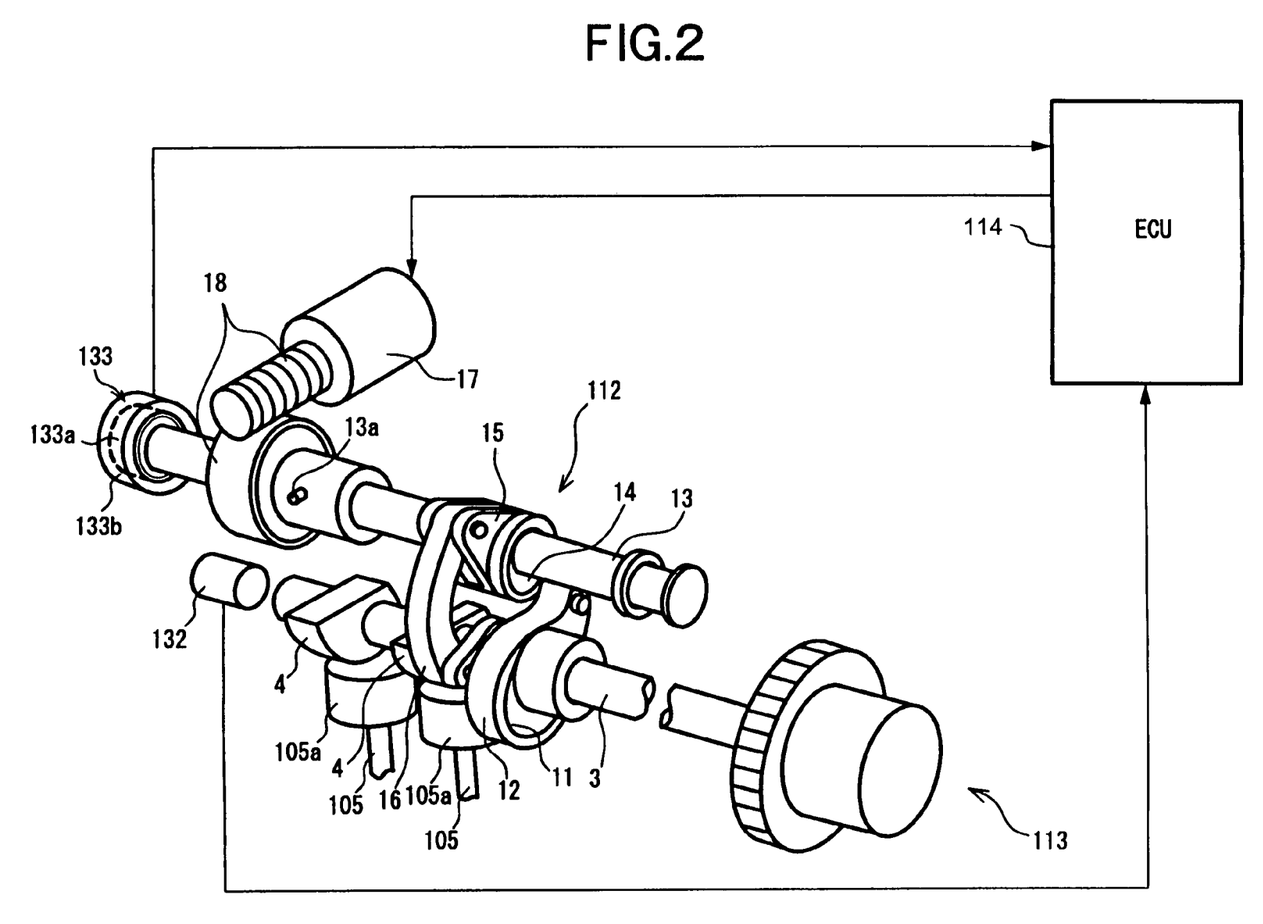
FIG. 2 is a perspective view showing a variable valve lift mechanism provided for the engine.

FIG. 2 is a perspective view showing a structure of variable valve lift mechanism 112.

In engine 101, a pair of intake valves 105, 105 is disposed to each cylinder, and above intake valves 105, 105, intake valve drive shaft 3 which is driven to rotate by crankshaft 120 is supported to extend in a direction along a cylinder train.

Swing cams 4 each of which is in contact with a valve lifter 105a of intake valve 105 to drive to open or close intake valve 105, are fitted to an outer surface of intake valve drive shaft 3, so as to be rotatable relative to intake valve drive shaft 3.

Between intake valve drive shaft 3 and swing cam 4, variable valve lift mechanism 112 which continuously varies the operating angle of intake valve 105 as well as the valve lift amount thereof, is disposed.

Further, on one end portion of intake valve drive shaft 3, there is disposed variable valve timing mechanism 113 which changes the rotational phase of intake valve drive shaft 3 relative to crankshaft 120 to continuously vary the phase of the center of the operating angle of intake valve 105.

Figure 3:
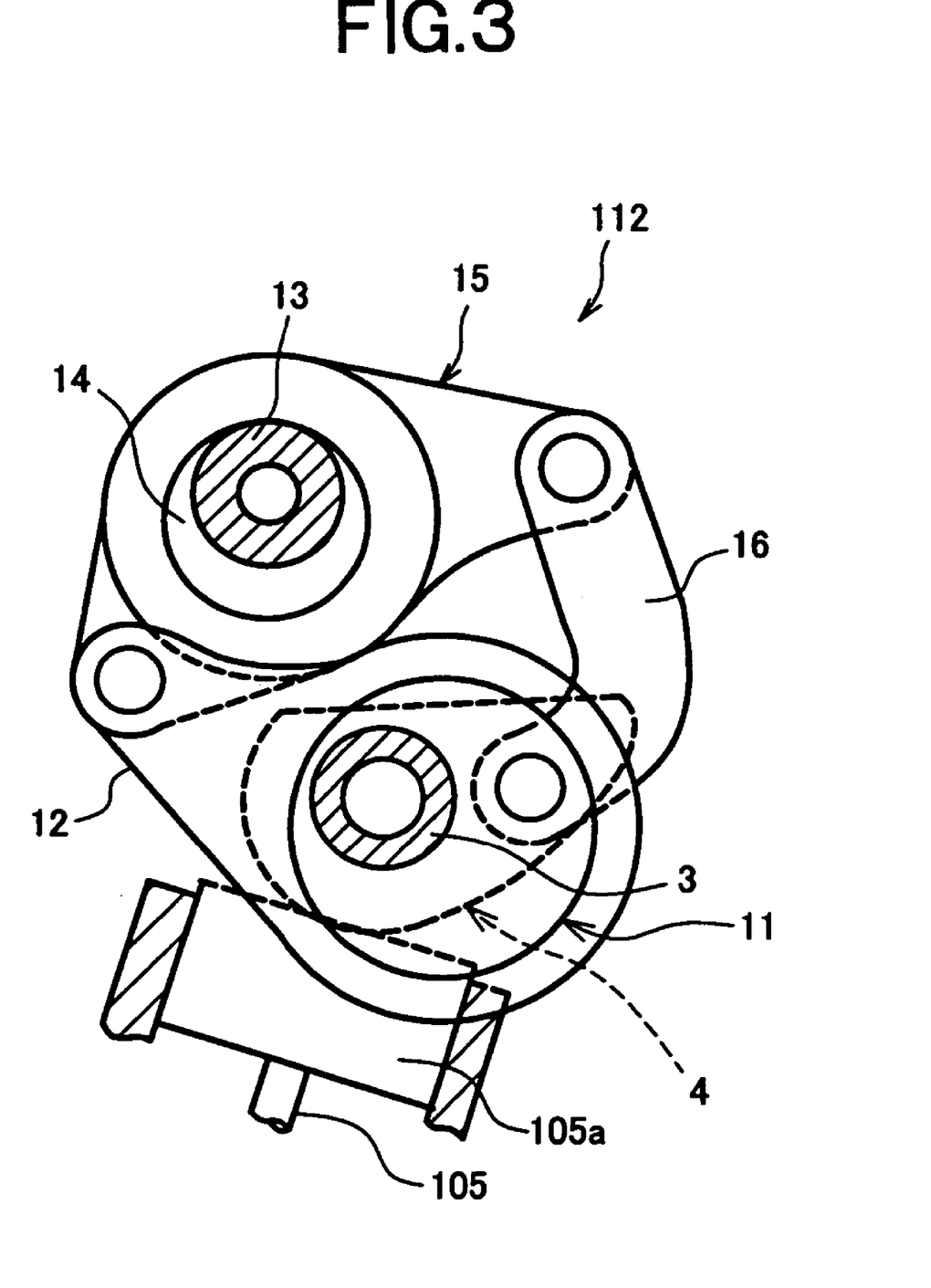
FIG. 3 is a cross-sectional view showing the variable valve lift mechanism.

As shown in FIGS. 2 and 3, variable valve lift mechanism 112 includes: a drive cam 11 of circular shape which is fixedly disposed on intake valve drive shaft 3 in an eccentric state; a link 12 of ring shape which is fitted to an outer surface of drive cam 11 to be rotatable relative to drive cam 11; a control shaft 13 which extends in a direction of the cylinder train to be in approximately parallel with intake valve drive shaft 3; a control cam 14 of circular shape which is fixedly disposed on control shaft 13 in an eccentric state; a rocker arm 15 which is fitted to an outer surface of control cam 14 to be rotatable relative to control cam 14, and also, is connected at one end thereof to a tip end of link 12 of ring shape; and a link 16 of rod shape which is connected to the other end of rocker arm 15 and to swing cam 4.

Control shaft 13 is driven to rotate by a motor 17 via a gear train 18. However, a stopper 13a disposed integrally with control shaft 13 is in contact with a stationary side (not shown), so that the rotation of control shaft 13 to a further decreasing side of lift amount is restricted at an angle position equivalent to a previously set minimum valve lift position.

Incidentally, in the present embodiment, control shaft 13 corresponds to a movable member of a motion mechanism, and motor 17 corresponds to an actuator. Further, a configuration may be varied in such a manner that in addition to the stopper that defines the minimum valve lift position, there is together provided a stopper that defines a maximum lift position.

According to the above configuration, when intake valve control shaft 3 cooperates with crankshaft 120 to be rotated via a suitable motion transmission mechanism, ring shaped link 12 performs the approximate translation via drive cam 11 and also, rocker arm 15 swings about the axle center of control cam 14, and further, swing cam 4 swings via rod shaped link 16, so that intake valve 105 is driven to open or close.

Further, by controlling motor 17 to change a rotating angle of control shaft 13, a position of the axle center of control cam 14, which is the swing center of rocker arm 15, is changed, so that the orientation of swing cam 4 is changed.

As a result, the operating angle of intake valve 105 and the lift amount thereof are continuously changed to be increased or decreased, while the phase of the center of the operating angle of intake valve 105 being approximately fixed.

Engine control unit 114 receives a detection signal from an angle sensor (position sensor) 133 for detecting the rotating angle of control shaft 13, and feedback controls the direction and magnitude of electric current for motor 17 based on a detection result of angle sensor 133 so as to rotate control shaft 13 to a target angle position corresponding to a target lift amount.

Incidentally, in variable valve lift mechanism 112, since a reaction force with the valve opening/closing exerts to decrease the lift amount, in order to maintain the lift amount, a motor torque against the reaction force is always required.

Angle sensor 133 is a non-contact type rotating angle sensor which, as disclosed in Japanese Unexamined Patent Publication No. 2003-194580, is comprised of a magnet 133a mounted on control shaft 13 and an electromagnetic conversion means 133b arranged at a position where it confronts against an outer peripheral surface of magnet 133a, to detect a change in magnetic flux due to the rotation of control shaft 13.

However, angle sensor 133 is not limited to such a non-contact type angle sensor, and may be a contact-type angle sensor using a conventional potentiometer, for example.

In the control of variable valve lift mechanism 112, an actual rotating angle of control shaft 13 is detected so as to detect an actual lift amount, and motor 17 is feedback-controlled so that the actual lift amount becomes coincident with the target lift amount.

Accordingly, if a correlation between an output of angle sensor 133 and the rotating angle of control shaft 13 is different from a reference correlation, the actual lift amount is erroneously detected.

Figure 4:
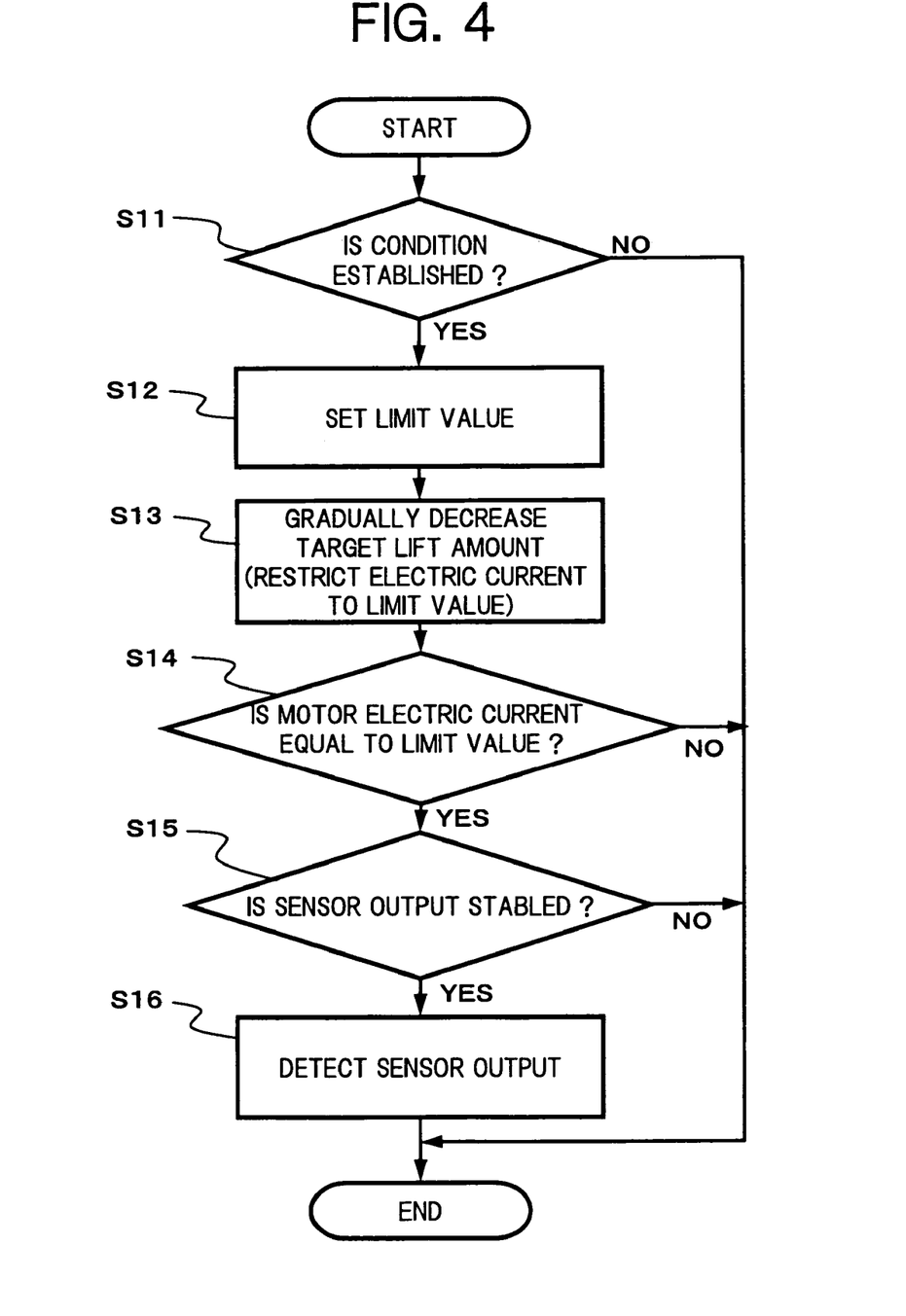
FIG. 4 is a flowchart showing a routine executed by a control unit in a first embodiment of the present invention.

Therefore, engine control unit 114 executes a control routine as shown in a flowchart of FIG. 4, to detect the output of angle sensor 133 at the minimum valve lift position (reference position) at which the rotation of control shaft 13 is restricted via stopper 13a that comes into contact with the non-illustrated stationary side, so that an actual correlation between the output of angle sensor 133 and the rotating angle of control shaft 13 is detected.

The control routine of the flowchart of FIG. 4 is interruptedly executed at each predetermined time.

In the flowchart of FIG. 4, firstly in step S11, it is determined whether or not a condition for detecting the output of angle sensor 133 at the reference position is established.

In order that the above-mentioned condition is established, for example, an operating condition of the engine is required to satisfy a condition such that the lift amount of intake valve 105 is able to forcibly be made minimum, and further, the engine is at the time of either fuel cut-off for deceleration or stopped condition thereof.

If the condition is established, the routine proceeds to step S12, where a manipulated variable (i.e., an amount of an electric current) supplied to motor 17 is set at a limit value thereof.

For example, in the case where the amount of electric current is controlled by controlling a duty ratio between on and off when electric excitation power supplied to motor 17 is periodically turned on or off, a limit value of the duty ratio is set as the limit value of the manipulated variable.

Figure 5:
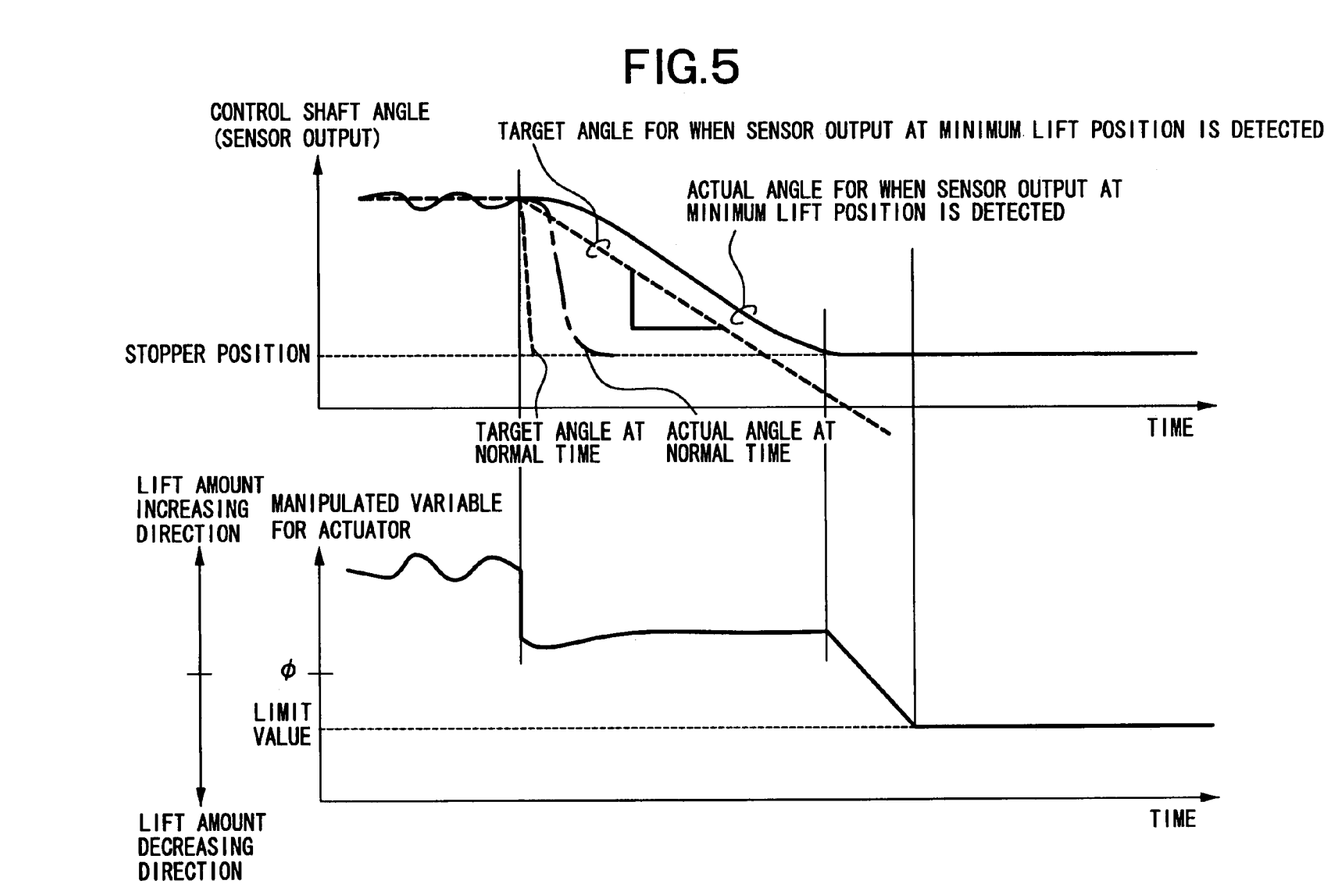
FIG. 5 is a timing chart showing a target angle of a control shaft, an actual angle thereof and a motor manipulated variable in the first embodiment.

In the present embodiment, a direction of the motor electric current producing a motor torque capable of increasing the lift amount is defined as a positive, while a direction of the motor electric current producing another motor torque capable of decreasing the lift amount is defined as negative, and as shown in FIG. 5, a negative predetermined value is set as the above limit value of the manipulated variable.

Then, in the case where the output of angle sensor 133 in the minimum lift amount is obtained, the manipulated variable of motor 17 is limited so that the motor electric current does not change to the negative side exceeding the limit value of the manipulated variable.

In next step S13, the target lift amount to be used for the feedback control of variable valve lift mechanism 112 is forcibly and gradually changed to be decreased from a normal value, so that the variable valve lift mechanism 112 is feedback-controlled based on the gradually-decreased-target-lift amount (refer to FIG. 5).

The motor electric current which is set in the feedback control is restricted so as not to exceed the limit value of the manipulated variable.

A changing speed in decreasing the target lift amount is set to be lower than that in the case where the target lift amount is normally changed. Thus, an angular speed (working speed) in the rotation of control shaft 13 toward the angle at which the rotation of control shaft 13 is restricted via stopper 13a is set to be lower than that in the case where the lift amount is normally controlled to the minimum lift amount.

If the angular speed of control shaft 13 is higher when control shaft 13 is rotated toward the angle at which the rotation of control shaft 13 is restricted by stopper 13a, when the rotation of control shaft 13 is restricted by stopper 13a, a mounting portion of magnet 133a in control shaft 13 is deflected due to an inertia force of control shaft 13, so that the output of angle sensor 133 is changed.

Here, if the target lift amount is changed in stepwise to the minimum lift amount, control shaft 13 is rotated at a high angular speed in order to follow this change, so that the rotation of control shaft 13 is restricted by stopper 13a in a state where control shaft 13 has a large inertia force. Therefore, there is a possibility that the mounting portion of magnet 133a in control shaft 13 is largely deflected, thereby significantly changing the output of angle sensor 133.

Therefore, in order to avoid the change in sensor output exceeding an allowable level due to the deflection by the inertia force, the change in the target lift amount is restricted so that the angular speed of control shaft 13 reaches an allowable angular speed or less.

In step S14, it is determined whether or not the manipulated variable (motor electric current) to be given to motor 17 is kept at the limit value.

If the target lift amount continues to be decreased even after the rotation of control shaft 13 is restricted via stopper 13a, the deviation of the actual lift amount from the target lift amount is enlarged, and as a result, the motor electric current is changed to the negative side by the feedback control, that is, the motor torque which acts so as to decrease the lift amount, is increased (refer to FIG. 5).

However, since the rotation of control shaft 13 is restricted via stopper 13a fixedly attached thereto, control shaft 13 does not further rotate even if the motor torque is increased, and the motor torque acting so as to decrease the lift amount, in turn produces a pressing force that stopper 13a exerts.

A state where the pressing force by stopper 13a is being produced stably maintains control shaft 13 at a rotation restricted condition, and therefore, can be preferable as a condition for detecting the sensor output at the minimum valve lift position.

However, if the pressing force becomes excessive, the mounting portion of magnet 133a in control shaft 13 must be considerably deflected, so that the output of angle sensor 133 is significantly changed.

Therefore, the electric current to motor 17 is restricted to the limit value, so that the pressing force by stopper 13a would not become excessive.

Further, it is assumed that the state where the electric current to motor 17 is restricted to the limit value resides in the state where the pressing force by stopper 13a is exerted so as to stably maintain the rotational restriction state of the control shaft 13.

Accordingly, in a state where the manipulated variable (motor electric current) supplied to motor 17 is not maintained at the limited value, the pressing force by stopper 13a is low and thus, the angular position of control shaft 13 is not stabled. Therefore, such a state is determined to be undesirable as the condition for detecting the sensor output at the minimum valve lift position, and the present routine is terminated without proceeding to step S15 and the subsequent steps.

On the other hand, if the manipulated variable (motor electric current) to motor 17 is maintained at the limited value, it is determined that the excessive pressing force which deflects the mounting portion of magnet 133a in control shaft 13 is not exerted by the stopper 13a, and further, the pressing force exerted by stopper 13a is maintained at a degree capable of stabilizing the angular position of control shaft 13, the routine proceeds to step S15.

Namely, after the manipulated variable given to motor 17 reaches the limit value, the output of angle sensor 133 is detected as the output at the minimum valve lift position.

In step S15, it is determined whether or not the output of angle sensor 133 is approximately fixed for a predetermined period of time or above, to thereby determine whether or not the rotation of control shaft 13 is stably restricted via stopper 13a.

Here, if it is determined that the output of angle sensor 133 is approximately fixed for the predetermined period of time or above, the routine proceeds to step S16.

In step S16, the output of angle sensor 133 at the time is detected as an output in response to the minimum valve lift position.

Then, the correlation between the sensor output and the lift amount (the rotating angle of control shaft 13) is rewritten based on the output in response to the minimum valve lift position, and thereafter, the output of angle sensor 133 is converted into data of lift amount (the rotating angle of control shaft 13) based on the rewritten correlation, to be used for the feedback control.

In the case where the correlation between the sensor output and the lift amount is rewritten, the correlation can be made coincident with output characteristics of angle sensor 133 by shifting the entire correlation based on the deviation of a detection value from a reference value of the sensor output, which is equivalent to the minimum lift amount, for example.

Further, in place of the rewriting of the correlation between the sensor output and the lift amount, it is possible to set a correction value for correcting the sensor output or the data of lift amount obtained based on the sensor output.

According to the above embodiment, in order to detect the sensor output at the minimum valve lift position, the change speed of the target lift amount is made lower than that in the normal change so that the angular speed of control shaft 13 is made lower, when control shaft 13 is rotated until the rotation thereof is restricted by stopper 13*a*.

Accordingly, the inertia force when control shaft 13 is rotated toward the minimum valve lift position can be made small, and thus, it is possible to suppress the change in the sensor output by the deflection of the mounting portion of magnet 133*a* when the rotation of control shaft 13 is restricted by stopper 13*a*.

Further, by restricting the manipulated variable for motor 17 to the limit value, it is possible to avoid that stopper 13*a* is pressed by the excessive force to deflect the mounting portion of magnet 133*a*.

Accordingly, it is possible to detect the sensor output at the minimum valve lift position with high precision.

Furthermore, since the state where the manipulated variable for motor 17 is kept at the limit value is made to be the condition for detecting the sensor output at the minimum valve lift position, it is possible to detect the sensor output in a stable state where stopper 13*a* is pressed by an appropriate force.

Incidentally, in the case where the stopper is also provided on the maximum lift position side, by making the change direction of the target lift amount different from that in the above embodiment, similarly to the above embodiment, the sensor output at the maximum lift position can be detected. In this case, in order to restrict the motor electric current exerting to increase the lift amount, such a motor electric current is restricted based on the positive limit value.

Further, after changing in stepwise the target lift amount to the vicinity of the minimum valve lift position or the maximum lift position at which the rotation of control shaft 13 is restricted by stopper 13*a*, it is possible to gradually change the target lift amount toward either the minimum valve lift position or the maximum lift position, and further, it may be possible to gradually lower the changing speed of the target lift amount.

Furthermore, when a gain of the feedback control is adjustably varied, it is possible to lower the angular speed of control shaft 13 during the rotation thereof toward the angular position at which the rotating motion thereof is restricted via stopper 13*a*.

Moreover, only the restriction may be achieve according to the limit value of a manipulated variable for motor 17, without controlling the angular speed of control shaft 13 rotating toward the minimum valve lift position.

Incidentally, by gradually changing the motor electric current to motor 17 by a feedforward-control in order to decrease the lift amount, control shaft 13 can be rotated to the minimum valve lift position at which the rotation thereof is restricted by the contacting engagement of stopper 13*a* with the associated stationary side. Such a configuration will be accomplished by a second embodiment, which will be described below with reference to a flowchart of FIG. 6.

Figure 6:
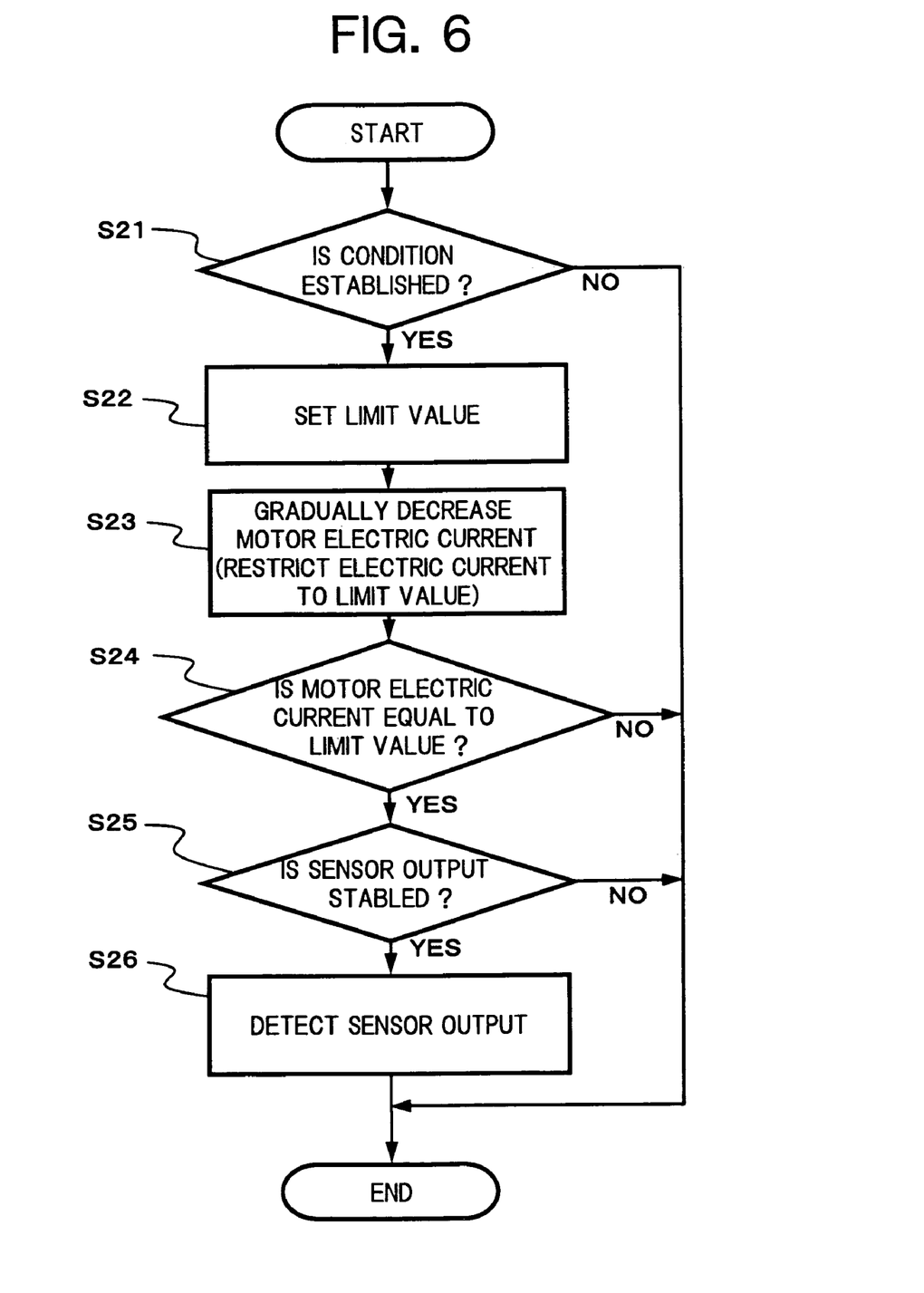
FIG. 6 is a flowchart showing a routine executed by the control unit in a second embodiment of the present invention.

In the flowchart of FIG. 6, in step S21, similarly to step S11, it is determined whether or not the condition for detecting the output of angle sensor 133 at the reference position (the minimum valve lift position) is established, and if the condition is established, the routine proceeds to step S22.

In step S22, similarly to step S12, the limit value of the electric current for motor 17 is set.

In step S23, the feedforward-control for decreasing the electric current for motor 17 by a predetermined amount at each predetermined period is executed, to thereby rotate control shaft 13 toward the minimum valve lift position.

As described in the above, in variable valve lift mechanism 112 in the present embodiment, since the reaction force with the valve opening/closing exerts to decrease the lift amount, in order to maintain an increase state of the lift amount, the motor torque against the reaction force is required.

Accordingly, if the motor torque against the reaction force is gradually decreased, the valve reaction force becomes stronger than the motor torque, so that control shaft 13 is rotated to a direction for decreasing the lift amount.

A speed for when the motor torque against the reaction force is gradually decreased is restricted to an allowable speed or less, at which the mounting portion of magnet 133*a* in control shaft 13 is not greatly deflected by the inertia force of control shaft 13 when the rotation of control shaft 13 is restricted via stopper 13*a*.

In step S24, it is determined whether or not the electric current for motor 17 is kept at the limit value.

In step S23, the feedforward-control for decreasing the electric current for motor 17 by the predetermined amount at each predetermined period is executed, but the electric current for motor 17 is restricted so as not to change exceeding the limit value which has been set in step S22.

Accordingly, in step S24, it is determined whether or not the electric current change by the feedforward-control is restricted to the limit value.

When the feedforward-control is executed, the motor torque exerting to increase the lift amount is gradually decreased, and thereafter, once the motor electric current becomes 0, the motor torque exerting to decrease the lift amount is generated.

However, the motor torque exerting to decrease the lift amount serves as the pressing force for stopper 13*a*, and if the pressing force becomes excessive, the mounting portion of magnet 133*a* in control shaft 13 is deflected, so that the sensor output is changed.

Therefore, the motor torque exerting to decrease the lift amount is restricted by restricting the motor electric current to the limit value, to thereby prevent the deflection of the mounting portion of magnet 133*a*. Further, the state where the electric current for motor 17 is kept at the limit value is detected as the state where the rotation of control shaft 13 is stably restricted by stopper 13*a*.

If it is determined in step S24 that the electric current for motor 17 is kept at the limit value, the routine proceeds to step S25, where it is determined whether or not the output of angle sensor 133 is approximately fixed for the predetermined period of time or above, to thereby judge whether or not the rotation of control shaft 13 is stably restricted by stopper 13*a*.

Here, if it is determined that the output of angle sensor 133 is approximately fixed for the predetermined period of time or above, the routine proceeds to step S26, where similarly to step S17, the sensor output in response to the minimum valve lift position is detected.

Incidentally, the movable member is not limited to control shaft 13, and further, the configuration may be such that the movable member moves linearly, and therefore, it is apparent that the present invention can be widely applied to systems each provided with: a movable member which is operated by an actuator and also is restricted with the motion thereof by a stopper; and a sensor for detecting a position of the movable member.

It should be appreciated that the entire contents of Japanese Patent Application No. 2006-017471 filed on Jan. 26, 2006, a priority of which is claimed, are incorporated herein by reference.

While only selected embodiments have been chosen to illustrate and describe the present invention, it will be apparent to those skilled in the art from this disclosure that various changes and modifications can be made herein without departing from the spirit and scope of the present invention as claimed in the appended claims.

Furthermore, the foregoing description of the embodiments according to the present invention is provided for illustration only, and not for the purpose of limiting the invention as claimed by the appended claims and their equivalents.

I claim:

1. An apparatus for controlling a motion mechanism, which is configured to move a movable member by an actuator, the apparatus comprising:
    a stopper which restricts a movable range of the movable member;
    a position sensor for outputting a signal in response to a position of the movable member;
    a control unit that determines a manipulated variable for the actuator in response to a position of the movable member, which is detected based on the signal from the position sensor, to output the determined manipulated variable;
    a reference position detecting unit that forcibly operates the actuator to move the movable member toward a reference position at which a movement of the movable member is restricted by the stopper, to detect the signal from the position sensor at the reference position; and
    a correcting unit that corrects control by the control unit based on the signal from the position sensor at the reference position,
    wherein the reference position detecting unit restricts the manipulated variable for the actuator based on a limit value when the movable member is moved toward the reference position, and
    wherein the reference position detecting unit restricts the manipulated variable for the actuator according to the limit value, and also restricts a moving speed of the movable member to a predetermined speed or less, when the movable member is moved toward the reference position.

2. The apparatus according to claim 1, wherein the control unit feedback-controls the manipulated variable based on a deviation between a target position of the movable member and a position of the movable member, which is detected based on the signal from the position sensor, and wherein the reference position detecting unit forcibly changes the target position toward the reference position to move the movable member toward the reference position, and also restricts a change speed of the target position to restrict a moving speed of the movable member to a predetermined speed or less.

3. The apparatus according to claim 1, wherein the reference position detecting unit forcibly changes the manipulated variable to move the movable member toward the reference position, and also restricts a speed for forcibly changing the manipulated variable to restrict a moving speed of the movable member.

4. The apparatus according to claim 1, wherein the reference position detecting unit detects the signal from the position sensor as a signal at the reference position, after the manipulated variable for the actuator reaches the limit value.

5. The apparatus according to claim 1, wherein the motion mechanism comprises a variable valve mechanism which varies opening characteristics of an engine valve, the movable member comprises a member driven to rotate by the actuator, and the position sensor outputs a signal in response to a rotating angle of the movable member.

6. The apparatus according to claim 5, wherein the reference position detecting unit moves the movable member toward the reference position during stopping of an engine.

7. An apparatus for controlling a motion mechanism, which is configured to move a movable member by an actuator, the apparatus comprising:
    a stopper which restricts a movable range of the movable member;
    a position sensor for outputting a signal in response to a position of the movable member;
    a control unit that determines a manipulated variable for the actuator in response to a position of the movable member, which is detected based on the signal from the position sensor, to output the determined manipulated variable;
    a reference position detecting unit that forcibly operates the actuator to move the movable member toward a reference position at which a movement of the movable member is restricted by the stopper, to detect the signal from the position sensor at the reference position; and
    a correcting unit that corrects control by the control unit based on the signal from the position sensor at the reference position,
    wherein the reference position detecting units:
        restricts the manipulated variable for the actuator based on a limit value when the movable member is moved toward the reference position; and
        determines that the movable member is kept stopped at the reference position, at a time when the signal from the position sensor is approximately constant for a predetermined period of time or above, and detects the signal from the position sensor at that time as a signal appearing at the reference position.

8. The apparatus according to claim 7, wherein the motion mechanism comprises a variable valve mechanism which varies opening characteristics of an engine valve, the movable member comprises a member driven to rotate by the actuator, and the position sensor outputs a signal in response to a rotating angle of the movable member.

9. The apparatus according to claim 8, wherein the reference position detecting unit moves the movable member toward the reference position during stopping of an engine.

10. An apparatus for controlling a motion mechanism, which is configured to move a movable member by an actuator, the apparatus comprising:
    a stopper which restricts a movable range of the movable member;
    a position sensor for outputting a signal in response to a position of the movable member;
    a control unit that determines a manipulated variable for the actuator in response to a position of the movable member, which is detected based on the signal from the position sensor, to output the determined manipulated variable;
    a reference position detecting unit that forcibly operates the actuator to move the movable member toward a reference position at which a movement of the movable member is restricted by the stopper, to detect the signal from the position sensor at the reference position; and a correcting unit that corrects control by the control unit based on the signal from the position sensor at the reference position, wherein:

the motion mechanism comprises a variable valve mechanism which varies a valve lift amount of an engine valve in response to a rotating angle of the movable member which is driven to rotate by the actuator;

the stopper restricts the rotation of the movable member to define a minimum valve lift amount;

the position sensor outputs a signal in response to a rotating angle of the movable member; and the reference position detecting unit restricts the manipulated variable for the actuator according to a limit value when the movable member is moved toward the reference position, and detects the signal from the position sensor at a time when the variable valve mechanism is controlled to a state exhibiting the minimum valve lift amount.

11. An apparatus for controlling a motion mechanism, which is configured to move a movable member by an actuator, the apparatus comprising:

a stopper which restricts a movable range of the movable member;

a position sensor for outputting a signal in response to a position of the movable member;

a control unit that determines a manipulated variable for the actuator in response to a position of the movable member, which is detected based on the signal from the position sensor, to output the determined manipulated variable;

a reference position detecting unit that forcibly operates the actuator to move the movable member toward a reference position at which a movement of the movable member is restricted by the stopper, to detect the signal from the position sensor at the reference position; and a correcting unit that corrects control by the control unit based on the signal from the position sensor at the reference position, wherein the motion mechanism comprises a variable valve mechanism which varies opening characteristics of an engine valve, and the movable member comprises a member driven to rotate by the actuator, the position sensor outputs a signal in response to a rotating angle of the movable member, and the reference position detecting unit moves the movable member toward the reference position in a fuel-supply-stop state where an engine is at a decelerating operation, and restricts the manipulated variable for the actuator according to a limit value when the movable member is moved toward the reference position.

12. An apparatus for controlling a motion mechanism that moves a movable member by an actuator, the apparatus comprising:

stopper means for restricting a movable range of the movable member;

position detecting means for outputting a signal in response to a position of the movable member;

control means for determining a manipulated variable for the actuator, in response to the position of the movable member, which is detected based on the signal from the position detecting means, to output the determined manipulated variable;

reference position detecting means for forcibly operating the actuator to move the movable member toward a reference position at which a movement of the movable member is restricted by the stopper means, to detect the signal from the position detecting means at a reference position; and correcting means for correcting control by the control means based on the signal from the position detecting means at the reference position, wherein the reference position detecting means restricts the manipulated variable for the actuator based on a limit value, and also restricts a moving speed of the movable member to a predetermined speed or less, when the movable member is moved toward the reference position.

13. A method of controlling a motion mechanism provided with an actuator which moves a movable member, a stopper which restricts a movable range of the movable member and a position sensor for outputting a signal in response to a position of the movable member, comprising the steps of:

forcibly changing a manipulated variable for the actuator to move the movable member toward a reference position at which rotation of the movable member is restricted by the stopper;

detecting the signal from the position sensor at the reference position; and correcting control of the actuator in response to the signal from the position sensor based on the signal from the position sensor at the reference position, wherein the step of moving the movable member toward the reference position comprises the steps of:

restricting the manipulated variable for the actuator based on a limit value; and restricting a moving speed of the movable member to a predetermined speed or less.

14. The method according to claim 13, wherein the motion mechanism is configured as a variable valve mechanism which varies opening characteristics of an engine valve, the movable member is configured as a member driven to rotate by the actuator, and the position sensor outputs a signal in response to a rotating angle of the movable member.

15. The method according to claim 14, wherein the step of moving the movable member toward the reference position further comprises the steps of:

detecting an operation stop state of an engine; and moving the movable member toward the reference position during stopping of an engine.

* * * * *